(12) United States Patent
Zou et al.

(10) Patent No.: US 7,648,205 B2
(45) Date of Patent: Jan. 19, 2010

(54) DISC RECLINER WITH MEMORY

(75) Inventors: Cheng Zou, Toronto (CA); Randolph P. Villarroel, Brampton (CA); Pius Ng, Markham (CA)

(73) Assignee: Intier Automotive Inc., Newmarket, Ontario (CA)

( * ) Notice: Subject to any disclaimer, the term of this patent is extended or adjusted under 35 U.S.C. 154(b) by 71 days.

(21) Appl. No.: 11/914,614

(22) PCT Filed: Jun. 13, 2006

(86) PCT No.: PCT/CA2006/001041

§ 371 (c)(1),
(2), (4) Date: Nov. 16, 2007

(87) PCT Pub. No.: WO2007/000041

PCT Pub. Date: Jan. 4, 2007

(65) Prior Publication Data

US 2008/0217980 A1 Sep. 11, 2008

(51) Int. Cl.
*B60N 2/02* (2006.01)
(52) U.S. Cl. .................. 297/367; 297/369
(58) Field of Classification Search ........ 297/367, 297/368, 369
See application file for complete search history.

(56) References Cited

U.S. PATENT DOCUMENTS

| | | | |
|---|---|---|---|
| 6,007,153 A * | 12/1999 | Benoit et al. .......... | 297/367 |
| 6,332,649 B1 | 12/2001 | Vossmann | |
| 6,454,354 B1 | 9/2002 | Vossmann et al. | |
| 6,626,495 B2 | 9/2003 | Okazaki et al. | |
| 6,726,281 B2 | 4/2004 | Baloche | |
| 6,742,844 B2 | 6/2004 | Pollack | |
| 6,749,263 B2 | 6/2004 | Peters | |
| 7,055,906 B2 * | 6/2006 | Shinozaki ............. | 297/367 |
| 2005/0035640 A1 | 2/2005 | Shinozaki | |

FOREIGN PATENT DOCUMENTS

| | | | |
|---|---|---|---|
| CA | 2495402 A1 | 3/2004 | |
| CA | 2511897 A1 | 1/2006 | |
| EP | 1870278 A1 * | 12/2007 | |
| JP | 2002209661 A * | 7/2002 | |

* cited by examiner

*Primary Examiner*—Anthony D Barfield
(74) *Attorney, Agent, or Firm*—Clark Hill PLC (57) ABSTRACT

A vehicle seat has a seat back and a seat cushion and a pair of recliners hingedly mounting the seat back to the seat cushion providing pivotal movement of a seat back relative to a seat cushion. Each of the recliners has a memory plate that holds the recliners in an unlocked condition during a predetermined amount of travel enabling return movement of the seat back from a forwardly folded position to a memory position. The memory position being within a range of recline seatback positions.

12 Claims, 8 Drawing Sheets

DISC RECLINER WITH MEMORY

FIELD OF INVENTION

The subject invention relates to a recliner assembly used in automobile seats for adjustment of a seat back relative to a seat cushion. In particular, this invention relates to a disc recliner having a memory feature and a seat incorporating such a recliner assembly.

BACKGROUND OF INVENTION

Automotive vehicles include vehicle seat assemblies for supporting a seated occupant in the vehicle. The seat assemblies comprise a generally horizontal seat cushion and a seat back pivotally connected to the seat cushion by a recliner assembly, allowing adjustment of the seat back relative to the seat cushion between a plurality of recline positions. Further, the recliner assembly typically allows the seat back to be folded flat against the seat cushion.

Disc recliners are well known in the vehicle seating art and are commonly used to pivotally connect a seat back to a seat cushion. Disc recliners commonly include a fixed cylindrical inner disc fixedly secured to the seat cushion and a cylindrical outer disc fixedly secured to the seat back and rotatably coupled to the inner disc. Disc recliners further include a locking mechanism for maintaining the angular position of the seat back relative to the seat cushion. The locking mechanism typically comprises an annular rim of teeth on the outer disc and several pawls each with a plurality of teeth. The pawls are moveable, either sliding or pivoting, in a radial direction between a locked position and an unlocked position. With the pawls in the locked position, the teeth on the pawls are interlocked with the rim of teeth on the outer disc, thus locking the angular position of the seat back relative to the seat cushion. When the pawls are moved from the locked position to the unlocked position, the teeth on the pawls are no longer interlocked with the rim of teeth on the outer disc, thus allowing adjustment of the seat back relative to the seat cushion.

It is often desirable to have a vehicle seat with a seat back that is moveable from a seating position to a forwardly dump position for allowing passengers to pass to the rear seats. Thus the seat back must have a defined range of motion. In prior art recliners, brackets that mount the recliner to the seat back and seat cushion are configured to have stops that limit the motion of the seat back relative to the seat cushion. These additional components add to the cost of the recliner, which in the current automotive supply industry is highly undesirable. Alternatively, tabs are formed on the inner and outer discs to define a range of motion.

Further, recliners of the prior art are normally ganged together so that only one release lever is required to operate the seat. When the occupant manipulates the lever to adjust the relative angle of the seat back or other desired operation, the recliners on both sides of the seat are simultaneously activated. A problem arises when prior art seats are manufactured. If the recliner on the inboard side is not perfectly aligned with and extending parallel to the recliner on the outboard side, the recliners will not be properly mounted on the rod joining or ganging the recliners. Improper mounting causes the recliners to bind increasing the effort required to operate the seat. Imperfect alignment is common within normal acceptable build tolerances.

Further, certain recliners of the prior art have a memory feature. The recliner is capable of returning to a predetermined position after the seat back has been moved forward to the easy entry position. It is desirable to incorporate a memory feature into a recliner assembly.

SUMMARY OF INVENTION

The disadvantages of the prior art may be overcome by providing a recliner assembly, which allows adjustment of the seat back relative to the seat cushion between a range of reclined seating positions and enabling the seat back to move to a folded forwardly or easy entry position. The recliner has internal means for providing a memory of the seat back to return from the easy entry position to a predetermined memory position. The memory position being within the range of reclined seatback positions.

In the preferred embodiment, a vehicle seat has a seat back and a seat cushion and a pair of recliners hingedly mounting the seat back to the seat cushion providing pivotal movement of a seat back relative to a seat cushion. Each of the recliners has a guide plate configured to be mounted to the seat cushion and a toothed plate rotatably assembled to the guide plate. The toothed disc has a flange having a series of internal teeth thereon. A plurality of pawls is mounted between the toothed plate and the guide plate. The pawls each has a toothed surface and is moveable between a locked position with the toothed surfaces engaging the series of teeth to lock the toothed plate relative to the guide plate, and an unlocked position with the toothed surfaces spaced from the teeth of the guide plate to allow movement of the toothed plate relative to the guide plate. A plurality of guides extends from the guide plate, guiding the pawls between the locked and unlocked positions. A cam is rotatably mounted between the guide plate and the toothed plate. The cam has a cam surface defined by a plurality of lobes for selective engagement with the pawls, selectively moving the pawls between the locked and unlocked positions. A spring continuously biases the cam, urging the pawls toward the locked position. A memory plate holds the pawls open during a predetermined amount of travel.

BRIEF DESCRIPTION OF DRAWINGS

The foregoing and other aspects of the invention will become more apparent from the following description of illustrative embodiments thereof and the accompanying drawings, which illustrate, by way of example only, the principles of the invention. In the drawings.

DETAILED DESCRIPTION OF PREFERRED EMBODIMENTS

Figure 1:
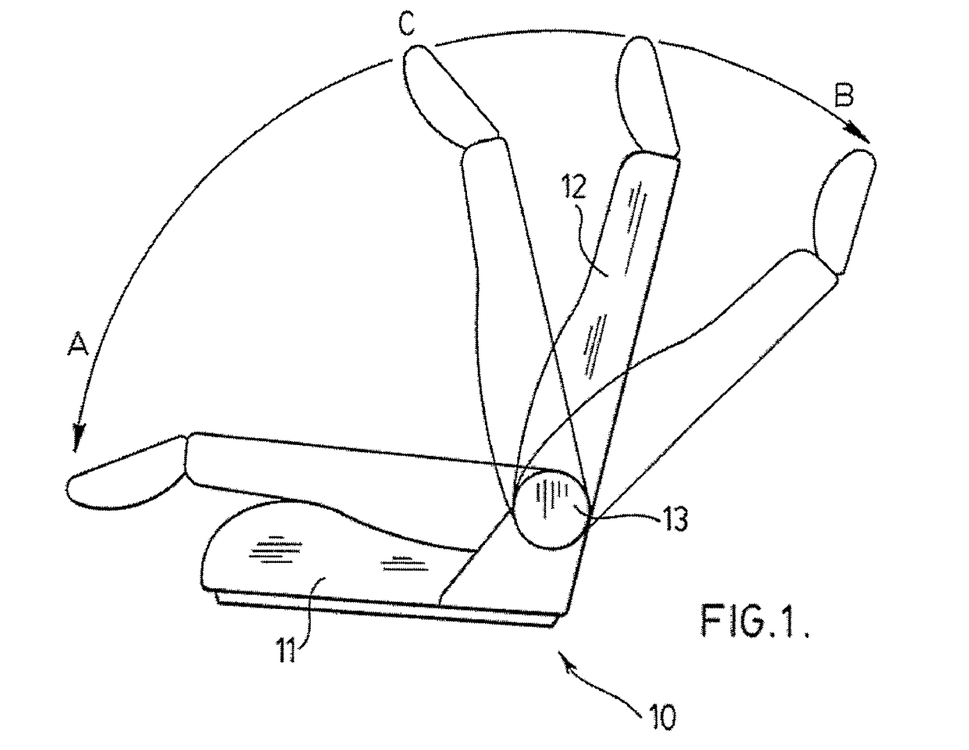
FIG. 1 is a side elevational view of a vehicle seat according to the preferred embodiment.

Referring to the Figures, FIG. 1 discloses a seat assembly 10 for use in an automotive vehicle. The seat assembly 10 includes a generally horizontal seat cushion 11 and a seat back 12. Each of the seat cushion 11 and seat back 12 typically comprises a rigid frame structure for supporting a contoured, foam pad encased by a trim cover as conventionally known to one skilled in the art. The seat assembly 10 also includes a recliner assembly 13 operatively interconnecting the seat cushion 11 and seat back 12 for pivotal movement of the seat back 12 between a plurality of reclined positions, as shown from D to B, one of which is a predetermined memory position D. Preferably position D, the memory position is canted rearwardly relative to the vertical. Further, the recliner assembly 13 allows pivotal movement of the seat back 12 to a forwardly folded position, as shown from C to A in FIG. 1. Preferably, the seat back 12 is biased towards the forwardly folded position.

Figure 2:
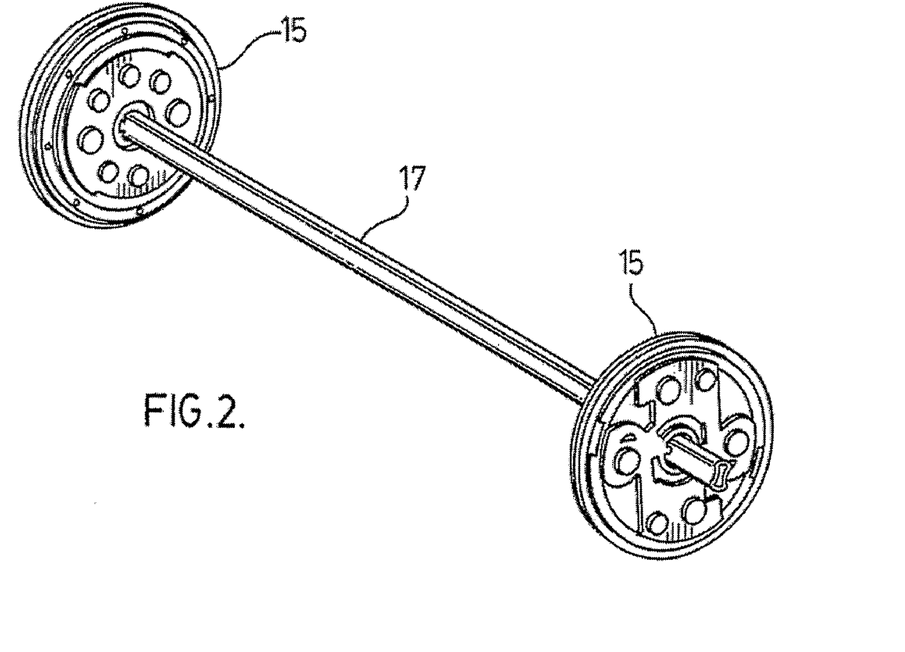
FIG. 2 is a perspective view of the recliner assembly of the vehicle seat of FIG. 1.

Referring to FIG. 2, the recliner assembly 13 of the present invention is generally illustrated. The recliner assembly 13 comprises a pair of disc recliners 15 coupled or ganged together by a hollow rod 17. Both the inboard and outboard disc recliners 15 are symmetrically opposite, which minimizes tooling and ultimately costs.

Figure 3:
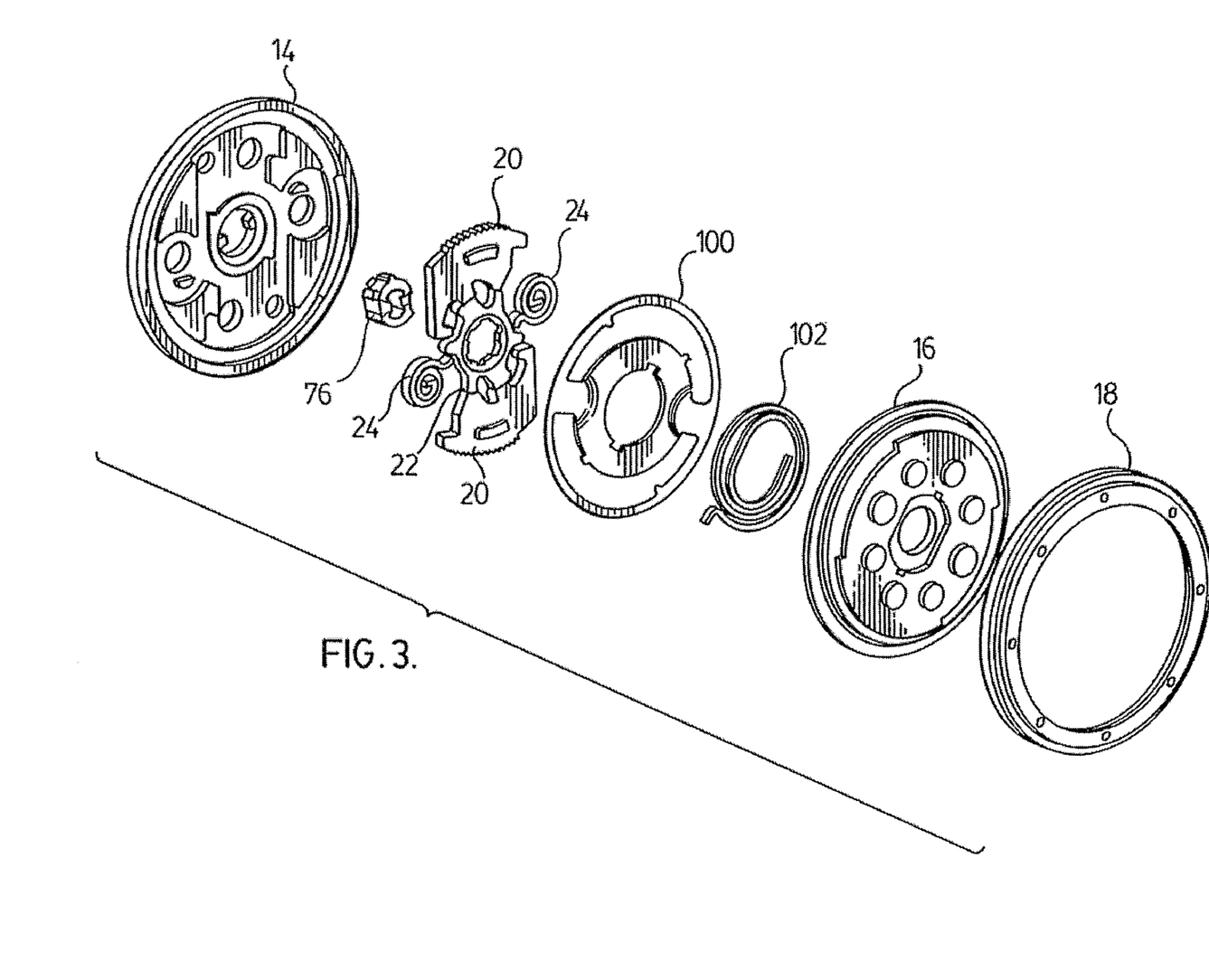
FIG. 3 is an exploded perspective view of the recliner of FIG. 1.

Referring to FIG. 3, the disc recliner 15 is illustrated in detail. Disc recliner 15 generally comprises a guide plate 14, a toothed plate 16, a retaining ring 18, a pair of toothed sliding pawls 20, a cam 22, a pair of springs 24, a bushing 76, a memory plate 100 and a memory return spring 102. The guide plate 14 and the toothed plate 16 are held together by the retaining ring 18 in a manner well known in the art.

Figure 4:
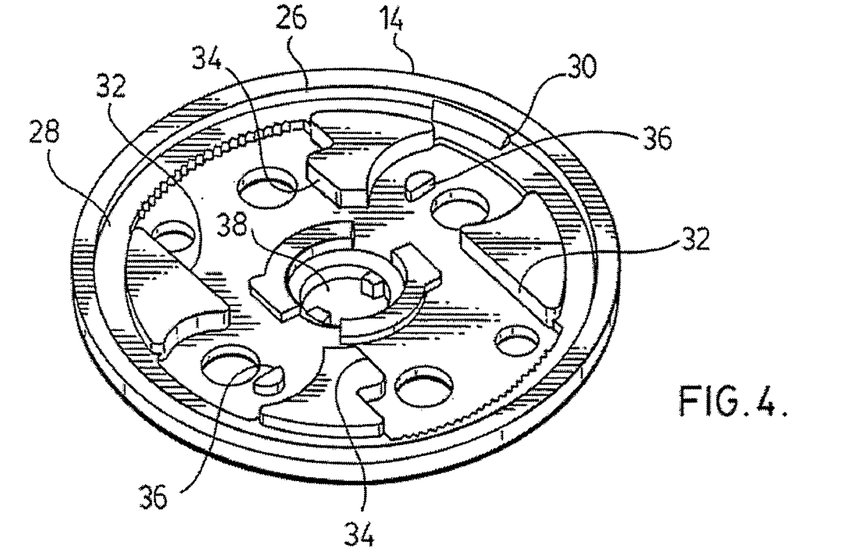
FIG. 4 is a perspective view of a guide plate of the recliner of FIG. 3.

Referring to FIG. 4, the guide plate 14 is generally cup shaped with an outer flange 26, defining an inner circumferential slot or track 28. Positioned in the track 28 is an abutment 30, presenting a stop. Spaced about the bottom surface of the guide plate 14 are a series of islands that define a first guide surface 32 and a second guide surface 34. The first and second guide surfaces 32, 34 cooperate with the sliding pawls 20 to limit travel thereof to a radial direction. First guide surface 32 is longer in length than the second guide surface 34, configuring the guide plate 14 to receive the "hammerhead" shape of the sliding pawls 20.

A pair of diametrically opposed stubs 36 are positioned normal to the direction of the travel of the sliding pawls 20. Stubs 36 receive springs 24 to provide a biasing force to the cam 22.

The central bore of plate 14 has a pair of diametrically opposed tabs 38. Tabs 38 engage with bushing 76 and provide a lost motion connection to the rod 17, defining limits of rotation of the rod 17 relative to the guide plate 14, as discussed in further detail below.

Figure 5:
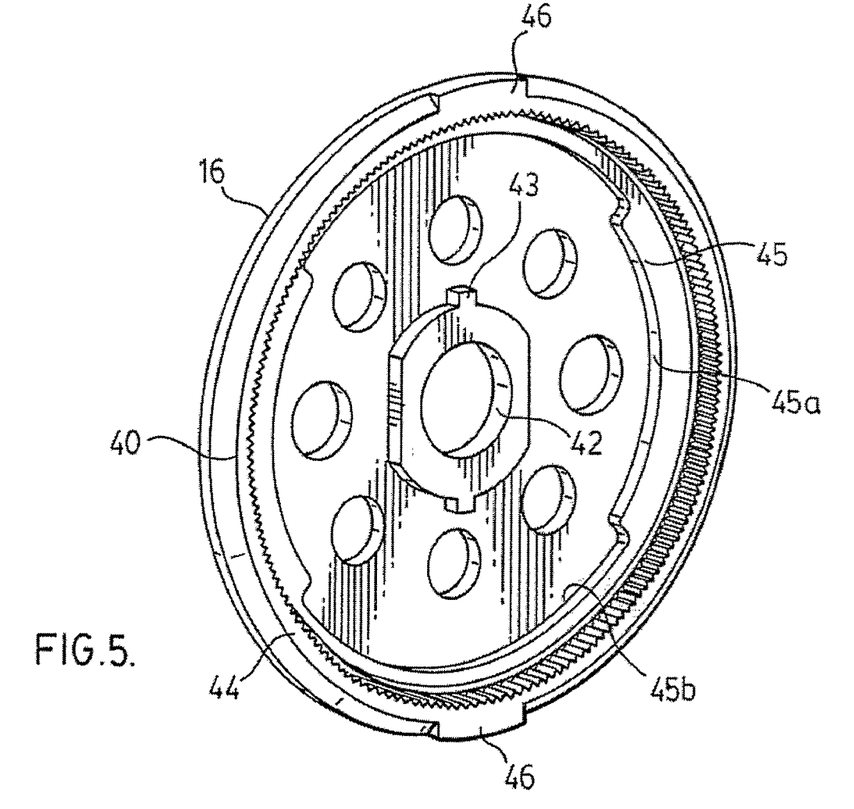
FIG. 5 is a perspective view of a toothed plate of the recliner of FIG. 3

Referring to FIG. 5, the toothed plate 16 is generally illustrated. The toothed plate 16 is generally cup shaped having a flange 40 and a central bore 42. The inner surface of the flange 40 has a series of spaced teeth 44. The outer surface of the flange 40 has a pair of diametrically opposed abutments 46. Toothed plate 16 has a central raised embossment having diametrically opposed tabs 43.

The inside face of the toothed plate 16 is recessed with the recessed portion defined by stepped cam surface 45 extending circumferentially about the toothed plate 16. Pips 104 of the sliding pawls 20 travel along cam surface 45. The inner portions 45a of the cam surface are positioned to define an "easy entry" movement of the seat back 12 relative to the seat cushion 11. Outer portion 45b defines a range of movement in which the recliner assembly 10 will lock the seat back 12 relative to the seat cushion 11. Inner portion 45a defines a range of movement in which the sliding pawls 20 will be prevented from locking with the teeth 44, enabling the seat back 12 to freely rotate forwardly.

The flange 40 is sized to fit in the track 28 of guide plate 14, enabling the toothed plate 16 to rotate relative to the guide plate 14. As the toothed plate 16 rotates in either direction, abutments 46 with engage with abutment 30 on guide plate 14, thereby providing a travel stop and limiting travel to about 180°.

Figure 6:
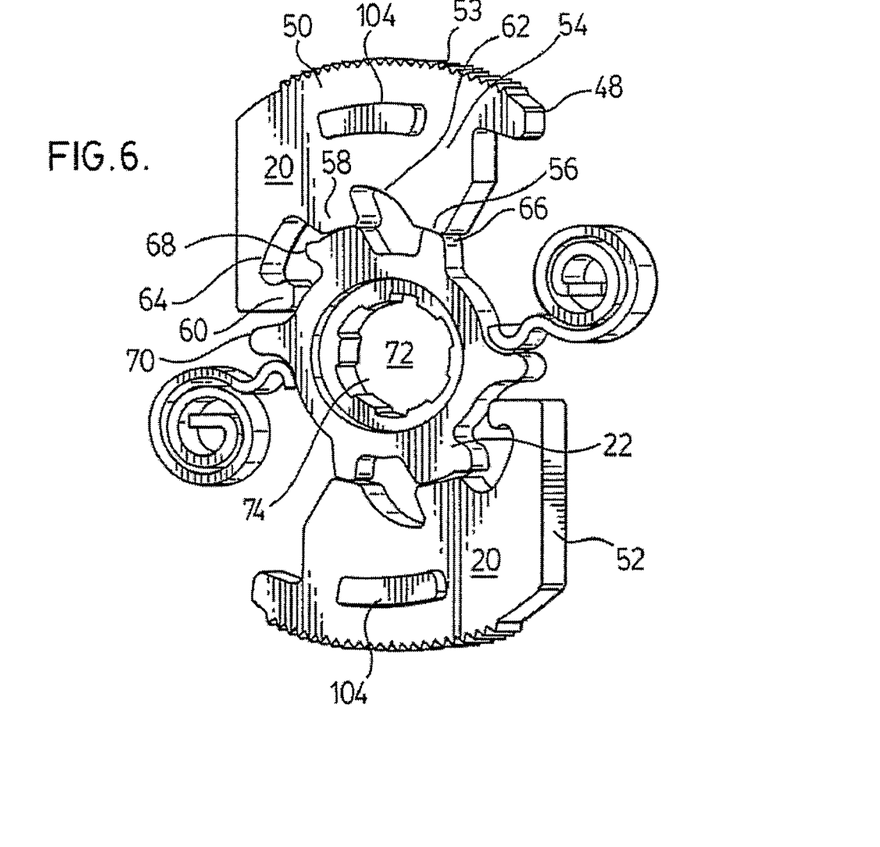
FIG. 6 is a partial perspective view of the cam and sliding pawl arrangement of the recliner of FIG. 3.

Referring to FIG. 6, the sliding pawls 20 have a "hammerhead" shape, in that the outer arcuate periphery 48 is wider than the sliding pawl body 53. The outer periphery 48 has a series of teeth 50 that are complementary to the teeth 44 on toothed plate 16. The slide body has a first slide surface 52 that slidingly engages with first guide surface 32 and a second slide surface 54 that slidingly engages with second guide surface 34. Slide surfaces 52, 54 are on opposite sides of the pawl body 53 and extend generally parallel to each other. Slide surface 52 is longer in length than slide surface 54. The inner peripheral edge of sliding pawls 20 has a cam follower surface defined by lobes or locking surfaces 56, 58 and release hook 60, interposed with recesses 62, 64.

The "hammerhead" shape of the sliding pawls 20 is preferred since the circumferential length of contact between the sliding pawls 20 and the teeth 44 is increased without increasing the width of the pawl body 53. Each of the sliding pawls 20 has a pip 104, preferably arcuate and semi-pierced, formed on the pawl body 53 (See FIG. 3). The semi-pierced pips 104 are spaced radially from the toothed surface 50.

The cam 22 has a cam surface defined by lobes or locking surfaces 66, 68 interposed with recesses. The cam surface is complementary to the cam follower surface of the sliding pawls 20, whereby the cam 22 initially urges the sliding pawls outwardly to lockingly engage the sliding pawls 20 with the toothed plate 16 (a locked condition) and as the cam 22 rotates, the sliding pawls 20 can move radially inward until locking surface 68 engages release hook 60 to positively urge the sliding pawls 20 to move radially inward (an unlocked condition) disengaged from the teeth 44.

The engagement between the locking surface 68 and locking surface 58 provides the majority of the locking force to retain the pawls in engagement with the teeth 44. The engagement between the locking surface 66 and locking surface 56 provide an anti-tipping force maintaining the sliding pawls 20 in alignment and preventing binding and the sliding pawls 20 move between the locked position and the unlocked position.

Cam 22 also has a pair of diametrically opposed spring tabs 70, which are positioned to engage with springs 24 to provide biasing of the cam 22 towards the locked condition.

Cam 22 has a central bore 72 having a series of circumferentially spaced tabs 74.

Figure 7:
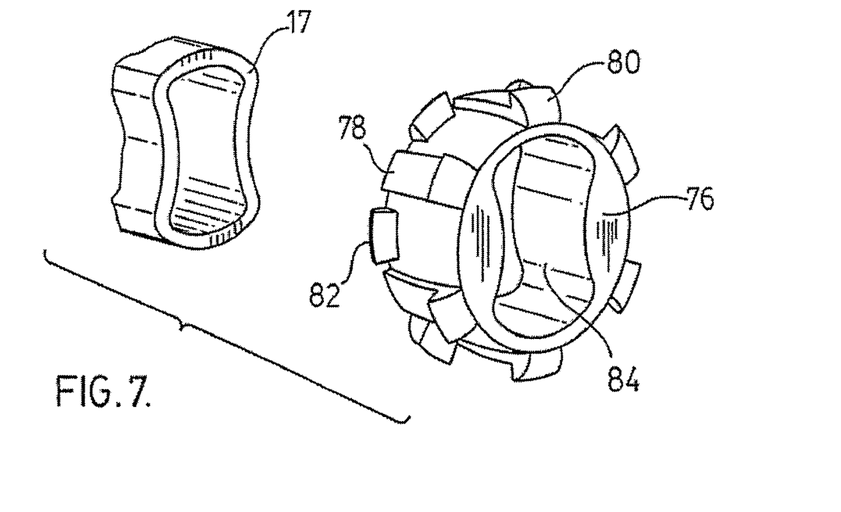
FIG. 7 is a perspective view of the bushing of the recliner of FIG. 3.

Bushing 76 is snap-fitted into the central bore 72. Bushing 76 has an outer peripheral surface that is bowed outwardly, i.e. the diameter of the outer surface is greater at a midpoint than at the inner and outer surfaces. The outer circumferential surface has a series of circumferentially spaced ridges or splines 78. The circumferential width of each spline 78 is less than the circumferential width of the spacing between tabs 74 on cam 22. This spacing provides a lost motion connection between the bushing 76 and the cam 22. The splines 78 each has a tapered hook 80 on the outer surface and each recess has a tapered hook 82, which configuration enables the bushing 76 to be snap fitted onto the cam 22.

The bushing 76 has a central aperture 84 that is configured to complement the rod 17 in a snug fit. Preferably, bushing 76 is injection molded with an organic resin material, such as NYLON™. Bushing 76 is capable of moving relative to the cam 22, enabling the bushing 76 to receive the rod 17 with a greater degree of freedom and thereby compensate for differences in orientation between the inboard and outboard recliners 15.

Figure 8:
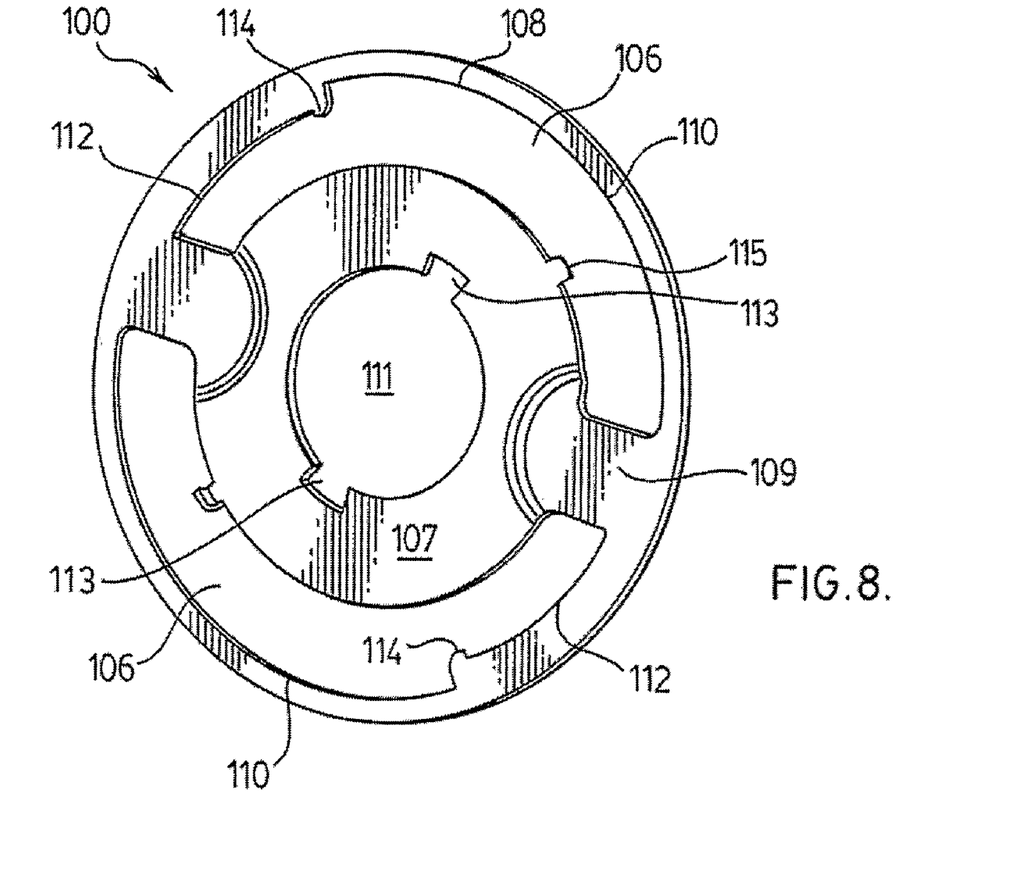
FIG. 8 is a perspective view of the memory disc of the recliner of FIG. 3.

Referring to FIG. 8, the memory disc 100 has an inner ring 107 and an outer ring 109 separated by a plurality of circumferentially spaced, but at least two, arcuate cut-outs or apertures 106. The number of apertures 106 corresponds to the number of pawls 20. Each aperture 106 has a stepped cam surface 108 defined by a second outer and a second inner circumferentially extending cam surfaces 110, 112, respectively, separated by a detent 114. Second outer cam surface 110 is radially spaced so that the memory disc 100 does not interfere with the pip 104 of the pawls 20 during the pawls locking and unlocking movement relative to teeth 44. Second inner cam surface 112 is radially spaced to be slightly greater than cam surface 45 so that the pip 104 of the pawls 20 will engage either second inner cam surface 112 or inner cam surface 45 during the pawls locking and unlocking movement relative to teeth 44, during the forward dumping and return movement.

Inner ring or hub 107 is embossed relative to ring 109 so that ring 107 is on a different plane than ring 109. Ring 107 has a central aperture 11 having two diametrically opposed cutouts 113. Inner ring 107 has at least one tang 115.

The memory disc 100 and the toothed plate 16 are configured so that the memory disc 100 has a lost motion connection with the toothed disc 16 and is capable of rotating relative to the toothed plate 16 for a predetermined amount of travel a. Memory disc 100 is provided with cutout 113 and toothed plate 16 is provided with diametrically opposed tabs 43. The circumferential length of cut out 113 determines the arcuate or angular distance a (i.e. lost motion) that memory plate 100 travels relative to toothed plate 16. Preferably, the arcuate distance is about 4-16°, with 6-10° being most prefereable. Other lost motion arrangements are well known in the art and may be utilized to provide the predetermined travel between the memory disc 100 and the toothed plate 16.

Spring 102 extends between the spring tang 115 on memory disc 100 and the toothed plate 16 and biases the memory disc 100 in a return direction to a home position wherein the radial edge of the detent 114 aligns with the edge 45c of inner cam surface 45. A return direction is the direction that the toothed plate 16 rotates when the seat back 12 and the toothed plate 16 is returning rearwardly from the easy entry position.

Figure 9:
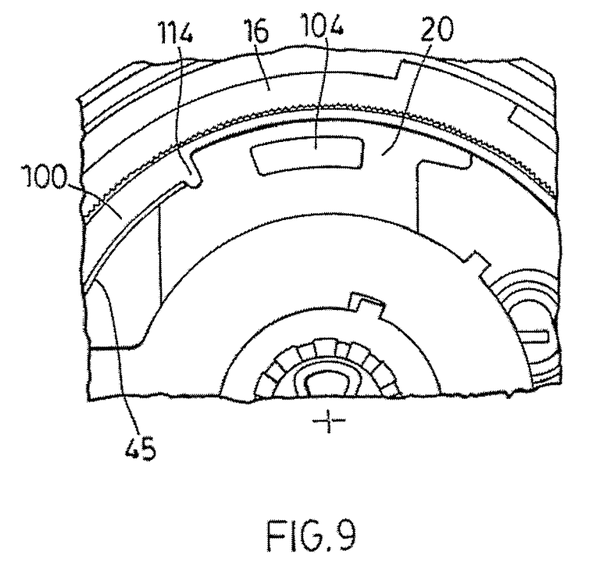
FIG. 9 is a side elevational view of an inboard recliner in a locked condition.

Referring to FIGS. 9 to 13, the recliner 13 is in the operating position as shown in FIG. 9. The memory disc 100 moves with the toothed plate 16 allowing the seat back 12 to move between a generally vertical position to a recline position. Memory disc 100 does not interfere with the normal operation of the pawls 20. Pip 104 is not in contact with the memory disc 100.

Figure 10:
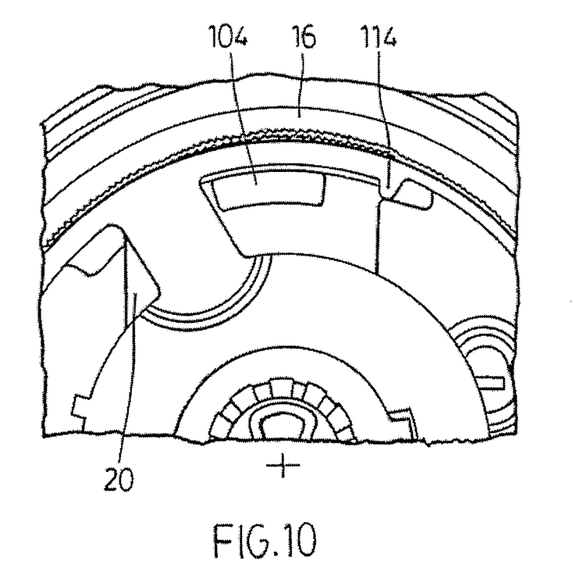
FIG. 10 is a side elevational view of an inboard recliner with the seat back in an easy access condition.

In FIG. 10, the seat back 12 has been rotated towards an easy entry position. The pawls 20 are retracted to the unlocked condition, allowing the toothed plate 16 and memory disc 100 to rotate. The detent 114 of the memory disc 100 will travel relatively beyond the pip 104.

Figure 11:
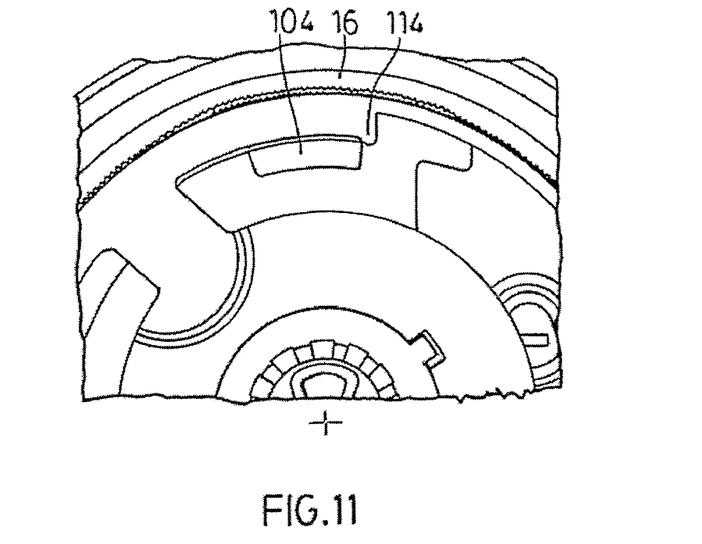
FIG. 11 is a side elevational view of an inboard recliner with the seat back returning to the operational position.

Referring to FIG. 11 and upon release of the actuation handle (not illustrated), the cam 22 will rotate, urging the pawls 20 to move towards the locked condition. The pip 104 is engaging inner cam surface 112 and 45b, which will maintain the pawls 20 from engaging with the toothed plate 16, i.e. prevent the pawls 20 from moving into the locked condition. The seat back 12 is able to rotate rearwardly. As the seat back 12 rotates, the toothed plate 16 rotates. The memory plate 100 will rotate with the toothed plate until the detent 114 engages the pip 104. The pip 104 prevents the memory plate 100 from rotating so that the memory plate 100 will rotate relative to the toothed plate 16 an arcuate amount α as permitted by tab 43 in cutouts 113, effectively extending the inner cam surface 112 and 45b by the arcuate amount α. Further rotation of the toothed plate 16 will urge the pawls 20 radially inwardly and thereafter memory plate 100 will travel with the toothed plate 16, and detent 114 will travel along the pip 104.

Figure 12:
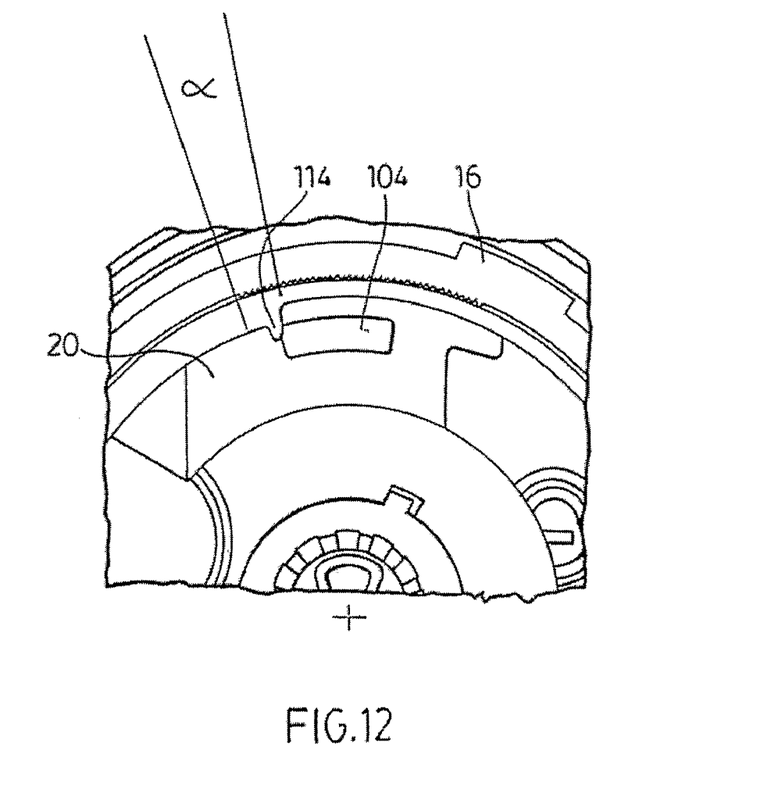
FIG. 12 is a side elevational view of an inboard recliner with the seat back in the memory position.

Referring to FIG. 12, the memory disc 100 has traveled the arcuate distance of the cutout 113 the arcuate length of the pip 104 and thereafter disengages with the pip 104, allowing the pawls to re-engage with the toothed plate, to the locked condition. The arcuate distance α of the cutouts 113 corresponds with the desired amount seat back travel beyond vertical to a predetermined memory position.

Figure 13:
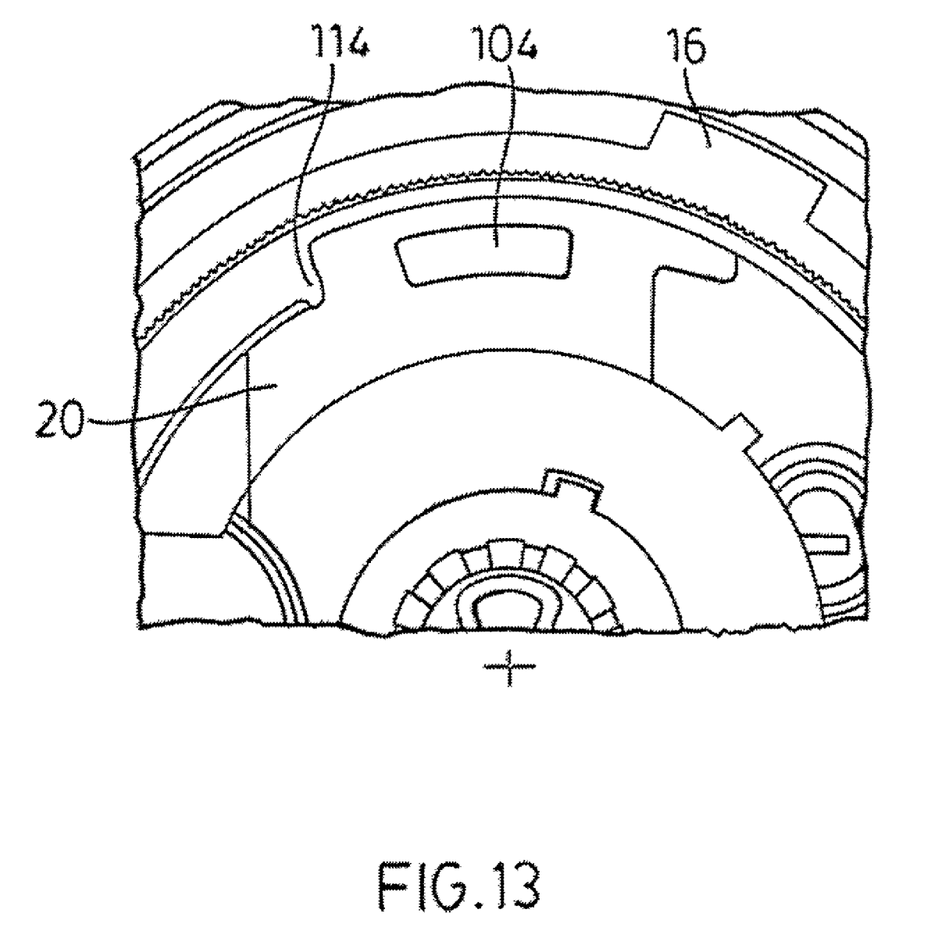
FIG. 13 is a side elevational view of an inboard recliner with the memory disc returning to the home position.

Referring to FIG. 13, once the detent 114 has traveled beyond the pip 104, the pawls move outwardly to the locked condition, preventing the toothed plate 16 from rotating. The spring 102 then urges the memory disc 100 to move back to a home position relative to the toothed plate 16.

The invention has been described in an illustrative manner, and it is to be understood that the terminology, which has been used, is intended to be in the nature of words of description rather than of limitation. Many modification and variations of the present invention are possible in light of the above teachings. It is, therefore, to be understood that within the scope of the appended claims, the invention may be practiced other than as specifically described.

The invention claimed is:

1. A recliner for providing pivotal movement of a seat back relative to a seat cushion between a range of selected seat back positions and a forwardly folded position, said recliner comprising:
   a guide plate;
   a toothed plate rotatably assembled to said guide plate, one of said guide plate and said toothed plate mounted to said seat back and the other of said guide plate and said toothed plate mounted to said seat cushion, said toothed disc having a flange having a series of internal teeth thereon and having a stepped cam surface;
   a plurality of pawls mounted between said toothed plate and said guide plate, said pawls each having a toothed surface and a pip, said pawls moveable between a locked position with said toothed surfaces engaging said series of teeth of said toothed plate to secure said toothed plate relative to said guide plate, and an unlocked position with said toothed surfaces spaced from said teeth of said guide plate allowing movement of said toothed plate relative to said guide plate, said pip engaging a portion of said stepped cam surface holding said plurality of pawls in said unlocked position enabling said seat back to move to the folded forward position;
   a plurality of guides extending from said guide plate, said guides receiving said pawls and guiding said pawls between said locked and unlocked positions;
   a cam rotatably mounted between said guide plate and said toothed plate, said cam having a cam surface defined by a plurality of lobes for selective engagement with said pawls, selectively moving said pawls between said engaged and disengaged positions upon rotation and counter-rotation of said cam;

a spring continuously biasing said plurality pawls toward said locked position;

a memory disc rotatably mounted on said toothed plate with a lost motion connection with said toothed plate enabling said memory disc to rotate a predetermined amount relative to said toothed plate extending said stepped cam surface holding said pawls in said unlocked position during a predetermined amount of rotation enabling said seat back to return to a memory position within said range of selected seat back positions, and a spring extending between said memory disc and said toothed plate urging said memory disc to align with said stepped cam surface.

2. A recliner as set forth in claim 1, wherein said memory disc has a detent that engages with at least one of said pips to rotate said memory disc relative to said toothed plate said predetermined amount, during return movement of said seat back.

3. A recliner as set forth in claim 1, wherein said memory disc has a second outer and a second inner circumferentially extending cam surfaces, said second outer cam surface being radially spaced so that the memory disc does not interfere with the pip during the pawls locking and unlocking movement, said second inner cam surface being radially spaced so that the pip will engage said inner cam surface of said toothed plate, preventing said locking movement of said pawls during forwardly folded of said seat back.

4. A recliner as set forth in claim 3, wherein said memory disc has a detent that engages with at least one of said pips to rotate said memory disc relative to said toothed plate said predetermined amount.

5. A recliner as set forth in claim 4, wherein said detent is disposed between said second outer and second inner cam surfaces.

6. A recliner as set forth in claim 5 wherein said stepped cam surface has a first outer and first inner cam surfaces corresponding to said second outer and second inner cam surfaces.

7. A recliner as set forth in claim 6, wherein said memory disc has an inner ring and an outer ring separated by a plurality of circumferentially spaced arcuate apertures, said apertures defining said second outer and second inner cam surfaces.

8. A recliner as set forth in claim 7, wherein said memory disc is embossed so that the inner ring and the outer ring extend on different planes.

9. A recliner as set forth in claim 8, wherein said inner ring has an arcuate slot and said toothed plate has a tab enabling said memory plate to rotate said predetermined amount.

10. A recliner as set forth in claim 1 further comprising a bushing engaging said cam, said cam and said bushing having a lost motion connection therebetween enabling limited relative rotation before said bushing engages said cam in a driving relation.

11. A recliner as set forth in claim 1, wherein at least one of said guide plate and said toothed plate has an abutment and the other of said guide plate and toothed plate has two abutments, said abutments positioned to limit rotational travel between said guide plate and said toothed plate to about 180°.

12. A vehicle seat incorporating a pair of recliners according to claim 1, wherein said recliners are mounted on opposite sides of said vehicle seat and has a rod extending between said pair of recliners, ganging operation of said pair of recliners together.

* * * * *